(Model.)

J. VANSANT.
DIFFRACTION CAMERA.

No. 357,746. Patented Feb. 15, 1887.

WITNESSES:
C. Neveux
C. Sedgwick

INVENTOR:
J. Vansant
BY Munn & Co
ATTORNEYS.

UNITED STATES PATENT OFFICE.

JOHN VANSANT, OF ST. LOUIS, MISSOURI.

DIFFRACTION-CAMERA.

SPECIFICATION forming part of Letters Patent No. 357,746, dated February 15, 1887.

Application filed July 9, 1886. Serial No. 207,610. (Model.)

*To all whom it may concern:*

Be it known that I, JOHN VANSANT, of the city of St. Louis and State of Missouri, have invented a new and useful Improvement in Diffraction-Cameras, of which the following is a full, clear, and exact description.

The object of my invention is to provide a diffraction-camera by which clear-cut and well-defined photographic pictures may be obtained.

The invention will be first described, and then specifically pointed out in the claims.

Figure 1:
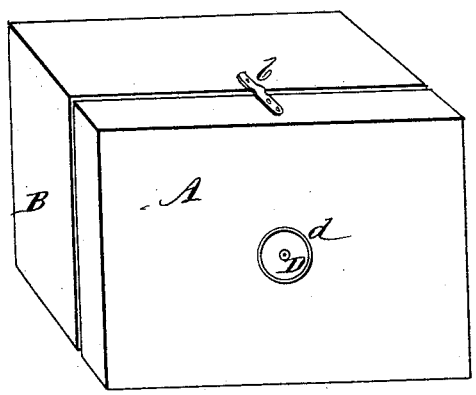
Figure 2:
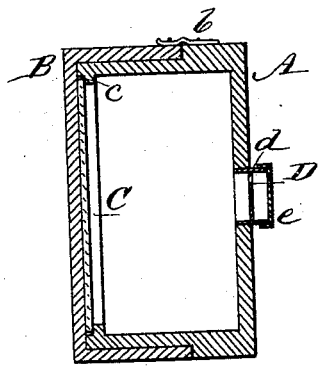
Figure 3:
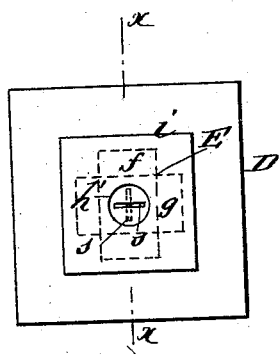
Figure 5:
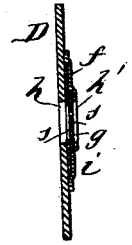
Figure 4:
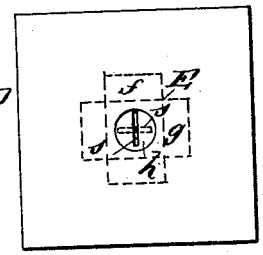
Figure 6:
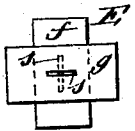

Reference is to be had to the accompanying drawings, in which Figure 1 represents a camera provided with one of my improved diffraction-diaphragms, the aperture in which is round. Fig. 2 is a cross-sectional view of a camera having a diffraction-diaphragm formed of two exceedingly thin plates having very narrow slits crossing each other at right angles to form a square aperture. Figs. 3 and 4 are reverse side views of this diffraction-diaphragm mounted upon a suitable holder. Fig. 5 is a transverse section of the same upon the line $x\ x$ of Fig. 3, and Fig. 6 is a face view of this diaphragm detached.

A represents the camera-case, having a removable or extensible section or cover, B, and a central aperture, $d$, provided with a short outward-projecting tube, in or over which the diffraction-diaphragm is located. A catch, $b$, is used for locking the two parts of the case together. The diffraction-diaphragm may be formed of a very thin plate of any suitable opaque material or combination of materials, and is provided with a minute aperture, which must not exceed seventeen one-thousandths of an inch in diameter, while in practice it is varied from one to fifteen one-thousandths of an inch in diameter. This aperture may be round, as in Fig. 1, or it may be angular, as shown in the other figures. I prefer, however, to form the diffraction-diaphragm E of two exceedingly thin (about one one-thousandths of an inch in thickness) strips of suitable material, secured together and having slits $s$ at right angles to each other, whereby a rectangular aperture is formed; but it will be understood that the diameter of the aperture must in no instance exceed seventeen one-thousandths of an inch, or thereabout. The diffraction-diaphragm E thus formed is secured by a cemented covering, $i$, to a holder, D, having a central aperture, $h$, over which the diaphragm is placed. This holder, with the diffraction-diaphragm, is placed within or over the opening $d$ in the camera, so that the only opening for the actinic and chemical rays of light will be through the said minute opening. A cap or other suitable device, $e$, adapted to fit upon the outer end of the tube, may be used to close the opening $d$, as will be readily understood.

The walls of the aperture in the diaphragm should be rendered non-reflecting. This may be done in case of silver-foil by the application of gaseous hydrogen sulphide, and in case of copper or brass by a careful oxidation in an alcohol-flame.

C is the sensitive film, and $c$ is the retaining-flange therefor within the part A of the case.

From observation I have found that the following rule may be laid down by which the length of exposure for any size of aperture, not of course exceeding seventeen one-thousandths of an inch in diameter, at any distance from the sensitive-plate can be easily calculated. Thus I take as a basis the time for fully impressing an "instantaneous" dry plate in a good outdoor light through a square aperture the twenty one-thousandths of an inch in diameter at a distance of one inch from the plate, which time is one second. The duration of exposure then varies directly as the square of the distance from aperture to plate and inversely as the relative areas of the apertures. I have also found that an aperture at one inch from the plate will successfully impress a circle at least two and one-half inches in diameter, and at three inches from aperture to plate a circle of about seven and one-half inches in diameter.

After long and continued experiments I have found that in order to make a diffraction-camera of the character described that will produce well-defined, clear-cut pictures the light-admitting aperture must not exceed seventeen one-thousandths of an inch in diameter.

If the aperture is made eighteen one-thousandths of an inch in diameter, the components of the picture will show double lines, and if the aperture is increased in diameter to the size of that made by an ordinary pin, the picture will be so blurred as to be worthless.

Any suitable style of construction of case for double or single pictures may be used with my improved diffraction-diaphragm, as occasion may require, without departing from the spirit of my invention.

I am aware that former experimenters have used what was termed a "pin-hole" camera for experiments in photometry, and that the use of a sensitive surface was suggested during such experiments; but one at least has stated that good photographic pictures could not be produced by such a camera, and this is true.

I am aware that a sight for use in fitting spectacle-frames to the wearers has been composed of a slotted plate, to which is pivoted another plate having a slot crossing the first-mentioned slot, and I do not claim the same as of my invention.

Having thus described my invention, what I claim as new, and desire to secure by Letters Patent, is—

1. As an improved article of manufacture, a diffraction-camera comprising the case A, having the central aperture, $d$, in its front end and the internal plate or film-retaining flange, $c$, adjacent to its rear open end, the diffraction-diaphragm having a minute aperture therein, the cap or cover $e$ for the diaphragm, and the removable section B, fitting upon the case A and serving to hold the sensitized plate or film in place against the shoulder or flange $c$, substantially as set forth.

2. The combination, with the case A, having the central aperture, $d$, in its front end, the tube within the aperture and projecting beyond the outer face of the case, the diaphragm within the tube, and the cap $e$, receiving and closing the outer end of said tube, of the section or cover B, substantially as set forth.

3. The combination, with the box or case of a camera having an opening therein, of a diffraction-diaphragm formed of two thin sheets or plates rigidly secured one upon the other, and having slots crossing each other at right angles to form a rectangular aperture of approximately seventeen one-thousandths of an inch in diameter, substantially as set forth.

4. An opaque diffraction-diaphragm for photographic cameras, formed of two thin sheets, plates, or films placed one upon the other, relatively fixed with regard to each other, and each having a narrow slit at an angle to each other, substantially as set forth.

5. In a photographic camera, the plate or holder D, having an aperture, $h$, the diffraction-diaphragm E, formed of two crossed plates, each having a slot at right angles to the other, and the covering $i$, securing the diaphragm to the holder, substantially as set forth.

JOHN VANSANT.

Witnesses:
   P. M. CARRINGTON,
   ALBERT ROEHRIG.